United States Patent
Loop

(12) United States Patent (10) Patent No.: US 7,136,063 B2
(45) Date of Patent: Nov. 14, 2006

(54) TRIANGLE MANAGEMENT IN TRIANGULAR MESHES BASED ON A TRI-EDGE STRUCTURE

(75) Inventor: Charles T. Loop, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 09/813,053

(22) Filed: Mar. 19, 2001

(65) Prior Publication Data

US 2002/0167516 A1 Nov. 14, 2002

(51) Int. Cl.
*G06T 17/00* (2006.01)

(52) U.S. Cl. ....................................................... 345/423
(58) Field of Classification Search ................. 345/418, 345/419, 420, 422, 423, 424, 427, 428
See application file for complete search history.

(56) References Cited

U.S. PATENT DOCUMENTS

| | | | |
|---|---|---|---|
| 5,963,209 A | 10/1999 | Hoppe | 345/419 |
| 6,545,676 B1 * | 4/2003 | Ryan et al. | 345/423 |
| 6,593,924 B1 * | 7/2003 | Lake et al. | 345/426 |
| 6,597,356 B1 * | 7/2003 | Moreton et al. | 345/423 |
| 6,600,487 B1 * | 7/2003 | Henn et al. | 345/423 |

OTHER PUBLICATIONS

"A polyhedron representation for computer vision", Baumgart, B., National Computer Conference, 1975, vol. 44, pp. 589–596.
Loop, Charles "A G1 triangular spline surface of arbitrary topological type", Computer Aided Geometric Design 11 (1994), Jun. 1993, pp. 303–330.

* cited by examiner

*Primary Examiner*—Phu K. Nguyen
(74) *Attorney, Agent, or Firm*—Lee & Hayes, PLLC

(57) ABSTRACT

Improved triangle management in triangular meshes uses a data structure having two fields to store data for each triangle in the triangular mesh. The first field is a set of three vertices for the triangle and the second field is a set of three edges, each edge corresponding to one of the three vertices. Each of the three edges is an identification of a next or subsequent edge that is encountered when performing a traversal (e.g., in a counterclockwise direction) about the corresponding vertex. According to one aspect, three operators are defined to assist in management of the triangular mesh. These operators are a make edge operator, a splice operator, and a swap operator, and are selectively invoked to both add triangles to the triangular mesh and remove triangles from the triangular mesh.

39 Claims, 15 Drawing Sheets

TRIANGLE MANAGEMENT IN TRIANGULAR MESHES BASED ON A TRI-EDGE STRUCTURE

TECHNICAL FIELD

This invention relates to graphics, and more particularly to improved triangle management in triangular meshes based on a tri-edge structure.

BACKGROUND OF THE INVENTION

Computer technology is continually advancing, resulting in a continuing stream of computers that are more powerful than their predecessors. One such area of advancement, and one that is of great importance to many designers as well as end users, is that of computer graphics. Computer graphics are used in a wide variety of fields, including entertainment (e.g., games), computer aided design, system modeling, and so forth.

Typically, computers manage graphics by manipulating small uniform geographic shapes that often times are triangles. Graphical objects and surfaces are described using groups of these triangles, and the triangles themselves are typically organized as a collection of vertices (i.e., each triangle is represented by a set of three vertices). Such a representation for triangles is well suited to hardware-accelerated rendering. However, such a representation also makes determining triangle and vertex adjacency cumbersome and computationally expensive. For example, given a particular vertex it can be very time-consuming to determine what its edge sharing neighbor vertices are. Determining triangle and vertex adjacency is crucial to many algorithms that deal with surfaces (e.g., refinement and smoothing algorithms, simplification and level of detail algorithms, etc.), yet the current systems for representing triangles are not well-suited to determining such triangle and vertex adjacency.

The invention described below addresses these disadvantages, providing improved structures and processes to manage triangles.

SUMMARY OF THE INVENTION

Improved triangle management in triangular meshes based on a tri-edge structure is described herein.

According to one aspect, a data structure having two fields is used to store data for each triangle in a triangular mesh. The first field is a set of three vertices for the triangle and the second field is a set of three edges, each edge corresponding to one of the three vertices. Each of the three edges is an identification of a next or subsequent edge that is encountered when performing a traversal (e.g., in a counterclockwise direction) about the corresponding vertex. In one implementation, each vertex in the set of three vertices includes a set of values representing the location of the vertex and an identification of a representative triangle edge corresponding to the vertex.

According to another aspect, triangles can be added to the triangular mesh. A triangle to be added to the triangular mesh is identified by a set of three vertices for the triangle. Upon receiving the three vertices, a check is made as to whether any of the edges that will be part of the new triangle already exist in the triangular mesh. If any of these edges already exist, a check is made as to whether connectivity of the mesh needs to be changed to accommodate the new triangle, and such changes are made if necessary. After performing these checks and any necessary connectivity changes are made, additional edges for the triangle are created as needed until two edges of the triangle exist. A third edge is then added to connect the free ends of the existing two edges, completing the triangle.

According to another aspect, triangles can be removed from the triangular mesh. The triangle to be removed is indicated by a triangle identifier. For each vertex of this triangle, a representative edge for the vertex is updated so that the representative edge for the vertex is not an edge of the triangle being removed. Then, for each edge of the triangle, the edge is removed and the connectivity of the other triangles in the triangular mesh is changed as needed so that any other triangle in the mesh having an identification of a next edge that is an edge of the triangle being removed has that identification changed to another edge of the mesh.

According to another aspect, three operators are defined to assist in management of the triangular mesh: a make edge operator, a splice operator, and a swap operator. The make edge operator receives two vertices as inputs and generates two triangles, with the two triangles having adjacent edges between the two vertices. The splice operator receives two edges as inputs and alters connectivity of triangles in the mesh including the edges. The swap operator receives a particular edge of a triangle in the mesh as an input, and returns an opposite diagonal of a quadrilateral corresponding to the input edge. The make edge, splice, and swap operators are selectively invoked to both add triangles to the triangular mesh and remove triangles from the triangular mesh.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
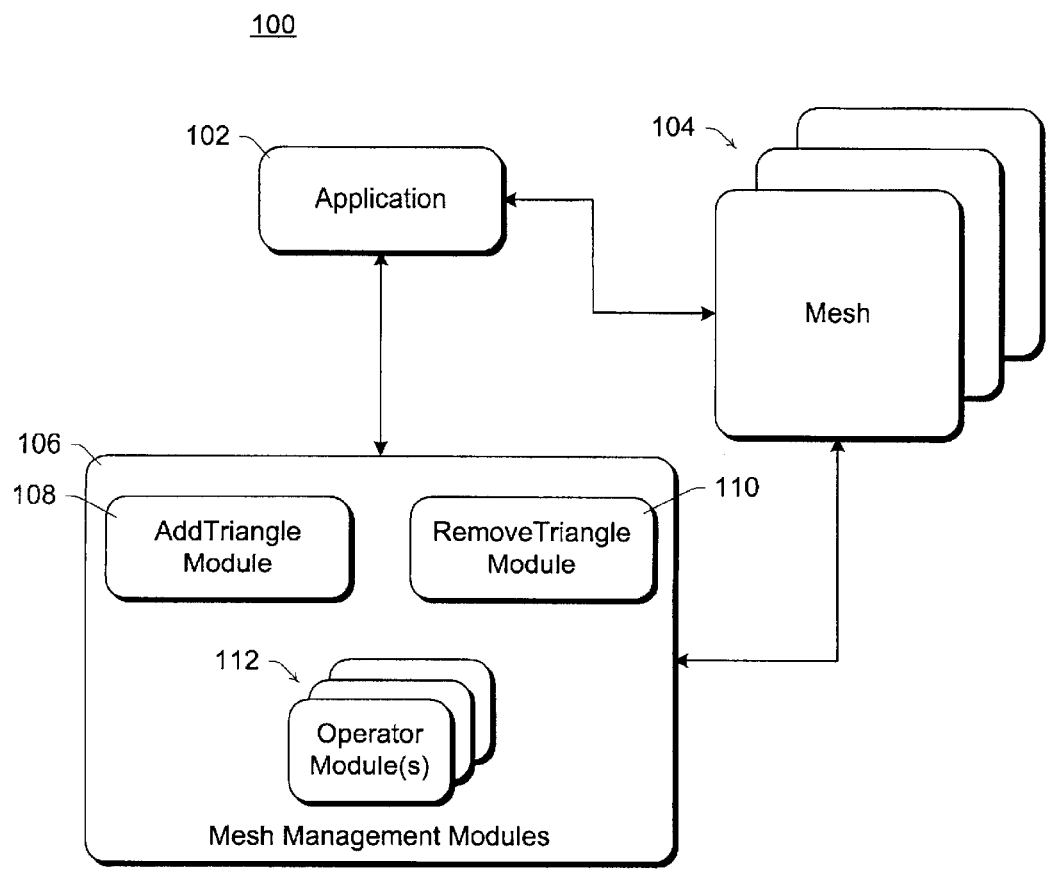
FIG. 1 illustrates an exemplary graphics management environment.

FIG. 1 illustrates an exemplary graphics management environment 100 including an application 102, one or more triangular meshes 104, and mesh management modules 106. In one embodiment, meshes 104 are each a set of one or more data structures defining the mesh, and are stored in volatile and/or non-volatile memory. Application 102 represents any of a wide variety of conventional applications, such as games, computer-aided design programs, drawing and other graphics programs, etc. Application 102 generates and manipulates meshes 104 with the assistance of mesh management modules 106.

Mesh management modules 106 include an AddTriangle module 108 for adding triangles to a mesh 104, a RemoveTriangle module 110 for removing triangles from a mesh 104, and one or more operator modules 112 that provide various mappings and perform various lower level operations on the triangles in a mesh 104.

Each of meshes 104 is a triangular mesh, which is a set or group of triangles that collectively form one or more surfaces when displayed. The surfaces can be of any shape—the "triangular mesh" refers to a mesh made up of triangles rather than the surface described by the mesh having a triangular shape. Each triangle is made up of both a set of vertices and a set of tri-edge structures, as discussed in more detail below. Mesh management modules 106 assist in the managing of adjacency, also described in more detail below.

Reference is made herein to homeomorphism. A homeomorphism is a continuous 1—1 mapping between spaces whose inverse is also continuous. A surface, or 2-manifold, is a point set such that every point has a neighborhood that is homeomorphic to a plane.

In a triangular mesh, each triangle t is a pair of triples, as follows:

$t=\{\{v_0,v_1,v_2\},\{e_0,e_1,e_2\}\}$

The first triple is a set of three vertices, referred to as a 2-simplex. Each one of the vertices v is a pair as follows:

$v=\{\{x,y\},r\}$

The value $\{x,y\}$ is a tuple of scalar values, such as point coordinates, a normal vector, and so forth, and r is a representative edge (this can be any edge that begins at the vertex v).

The second triple in a triangle t is a tri-edge structure including three edges, each edge being a pair as follows:

$e=\{t,i\}$ where t is the triangle that the edge belongs to, and i is an index value indicating the position of the edge in the triangle t. The position index i is an element of the set $\{0,1,2\}$ and mathematical operations described herein involving the position index i are taken modulo 3. The edges of a tri-edge structure are not the edges of the associated 2-simplex. Rather, each edge $e_i$ is the next edge that would be encountered in a counter-clockwise traversal from the associated 2-simplex (beginning at the edge of the 2-simplex connecting the vertices $v_i$ and $v_{i-1}$) about the vertex $v_i$.

In an alternative embodiment, an additional "flip" field f is added to each edge, making it a triple rather than a pair (e.g., $\{t,i,f\}$). The flip field is a binary field to enable the representation of non-orientable manifolds. If the value in the flip field is changed, the edges can be viewed as being in the opposite direction (e.g., as if the mesh were being viewed from the opposite side).

Figure 2:
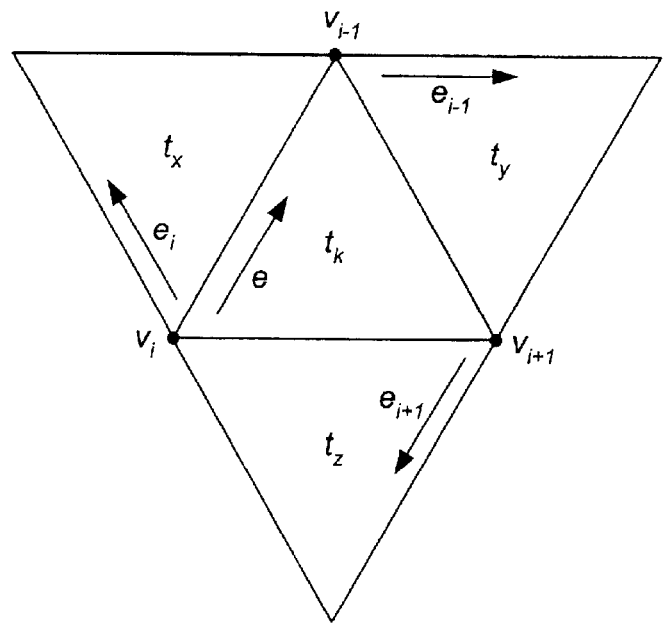
FIG. 2 illustrates an exemplary triangle and its corresponding tri-edges.

FIG. 2 illustrates an exemplary triangle and its corresponding tri-edges. A triangle $t_k$ is illustrated as including an edge $e=\{t,i\}$. As used herein, edges point from a vertex $v_i$ (the origin) to a vertex $v_{i-1}$ (the destination). The tri-edges for triangle $t_k$ are also illustrated, with the three edges in the tri-edge structure being identified as $e_i$, $e_{i-1}$, and $e_{i+1}$. The edge $e_i$ (an edge of triangle $t_x$) is the next edge that would be encountered in a counter-clockwise traversal from edge e about the vertex $v_i$. Similarly, the edge $e_{i-1}$ (an edge of triangle $t_y$) is the next edge that would be encountered in a counter-clockwise traversal from the edge of triangle $t_k$ connecting vertices $v_{i-1}$ and $v_{i+1}$ about the vertex $v_{i-1}$, and the edge $e_{i+1}$ (an edge of triangle $t_z$) is the next edge that would be encountered in a counter-clockwise i traversal from the edge of triangle $t_k$ connecting vertices $v^{i+1}$ and $v_i$ about the vertex $v_{i+1}$.

A special boundary vertex $v_\infty$ (also referred to as $v_{inf}$) is used for triangles that are on the boundary of the mesh. The boundary of the mesh refers to areas where the surface being described by the mesh ends, and can be in the interior or at the periphery of the surface. For example, triangles adjacent a hole cut in the surface are boundary triangles. Triangles that are not where the mesh ends are referred to as interior triangles. Some surfaces may not have any boundary triangles (e.g., a sphere), although since such surfaces are typically created triangle-by-triangle, such surfaces will have boundary triangles during their creation. Any triangle that is at the boundary of a mesh has a vertex of $v_\infty$—triangles that are on the interior of the mesh do not have any vertex of $v_\infty$. In one implementation, the value of $v_\infty$ is a reserved value that a vertex typically does not have (e.g., the hexadecimal value ffffffff).

Figure 3:
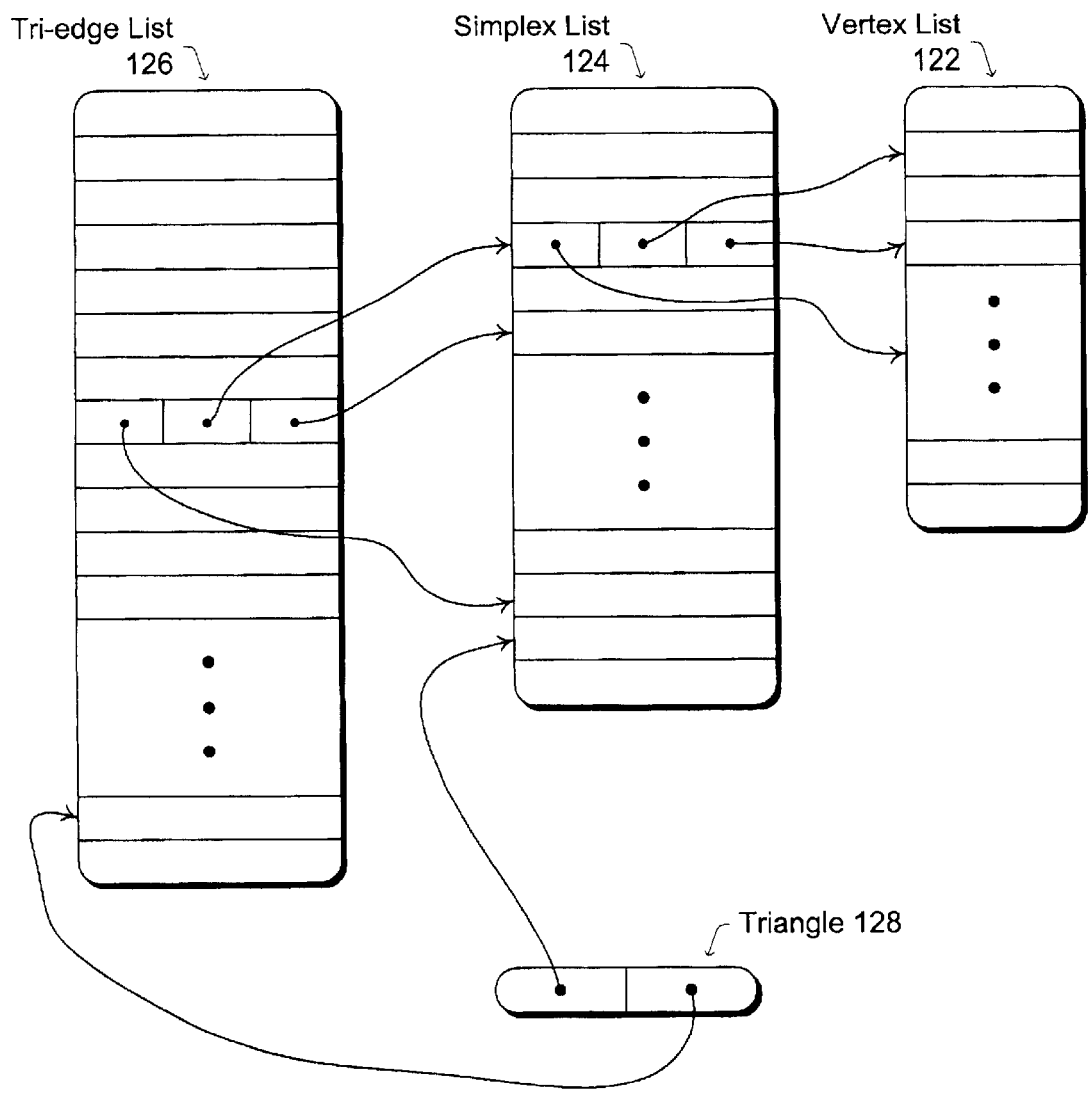
FIG. 3 illustrates an exemplary structure for storing the data representing a triangular mesh.

FIG. 3 illustrates an exemplary structure 120 for storing the data representing a triangular mesh. The data is stored in three portions or lists: a vertex list 122, a simplex list 124, and a tri-edge list 126. Vertex list 122 is a list of vertices v in the mesh. Simplex list 124 is a list of 2-simplexes in the mesh, with each entry in simplex list 124 identifying one of three vertices of the 2-simplex. In the illustrated example, each entry in simplex list 124 includes three pointers to three vertices in vertex list 122.

Tri-edge list 126 is a list of tri-edges. Each entry in list 126 is a tri-edge for a particular triangle, including three references to $\{t,i\}$ pairs. The reference to the triangle (t) is a pointer to one of the 2-simplexes in list 124, and the position index (i) is the numerical value for the position index. A triangle 128 in the mesh includes two references—a reference to one of the 2-simplexes in simplex list 124, and a reference to one of the tri-edges in tri-edge list 126.

The structure 120 is merely an exemplary structure for maintaining the data representing the triangular meshes. Alternatively, any of a wide variety of other structures may be used. For example, simplex list 124 may include the actual values for the vertices rather than pointers to entries in vertex list 122. By way of another example, other structures besides the vertex list, simplex list, and tri-edge list may be used.

Figure 4:
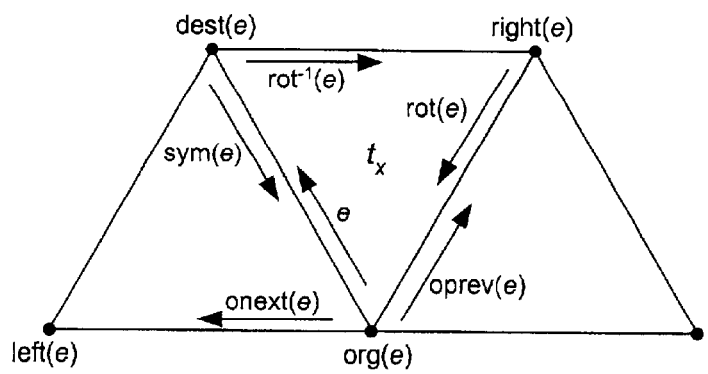
FIG. 4 illustrates an exemplary set of operators for traversing edges and accessing elements of a mesh.

Various operators (e.g., operator modules 112 of FIG. 1) are defined and used for traversing edges and accessing elements of a mesh. FIG. 4 illustrates an exemplary set of such operators. These operators are described with reference to an edge e of the triangle $t_x$ having a position index i. A first set of these operators match edges to edges, and are referred to as: rot(e), rot$^{-1}$(e), onext(e), oprev(e), and sym(e).

The rotate or rot(e) operator maps to the next edge in the triangle $t_x$ in the counterclockwise direction, and is defined as follows:

$$rot(e) = \{t_x, i+1\}$$

The inverse rotate or rot$^{-1}$(e) operator maps to the next edge in the triangle $t_x$ in the clockwise direction (which is equivalent to twice rotating to the next edge in the counterclockwise direction), and is defined as follows:

$$rot^{-1}(e) = rot(rot(e))$$

The next edge or onext(e) operator maps to the next edge (also referred to as the subsequent edge) from edge e when rotating about the vertex $v_i$ in the counterclockwise direction. The onext(e) operator is defined as follows:

$$onext(e) = \text{tri-edge } e_i \text{ of triangle } t_x$$

The previous edge or oprev(e) operator maps to the next edge in the next triangle when rotating about the vertex $v_i$ in the clockwise direction. The oprev(e) operator is defined as follows:

$$oprev(e) = rot(onext(rot(e)))$$

The same or sym(e) operator maps to the edge of another triangle that shares the same vertices as edge e (although the edge is in the opposite direction of edge e), and is defined as follows:

$$sym(e) = rot(onext(e))$$

Another set of these operators maps edges to vertices. These edge to vertex mapping operators are referred to as: org(e), dest(e), right(e), and left(e).

The origin or org(e) operator maps to the vertex that is the origin of the edge e, and is defined as follows:

$$org(e) = \text{vertex } i \text{ of triangle } t_x$$

The destination or dest(e) operator maps to the vertex that is the destination of the edge e, and is defined as follows:

$$dest(e) = org(rot^{-1}(e))$$

The right(e) operator maps to the other vertex of the edge of triangle $t_x$ that shares vertex i with edge e, and is defined as follows:

$$right(e) = org(rot(e))$$

The left(e) operator maps to the vertex that is the destination of the next edge from edge e when rotating about the vertex $v_i$ in the counter-clockwise direction, and is defined as follows:

$$left(e) = dest(onext(e))$$

Another set of these operators perform other useful operations, and are referred to as: getRep(v), setRep(v,e), setOrg(e,v), and setOnext(a,b).

The get representative edge or getRep(v) operator maps to the representative edge (r) of the vertex v. The set representative edge or setRep(v,e) operator sets the representative edge (r) of the vertex v to the edge e. The set origin or setOrg(e,v) operator sets the vertex i of the edge e (connecting vertex $v_i$ to vertex $v_{i-1}$) to v. The set next edge or setOnext(a,b) operator sets the tri-edge a to b.

Three additional operators are also defined to manipulate triangles in the mesh. These three operators are: MakeEdge($v_0,v_1$), Splice(a,b), and Swap(e).

The MakeEdge($v_0,v_1$) operator constructs a mesh T of two triangles a and b, and returns an edge of the triangle a. An exemplary implementation of the MakeEdge($v_0,v_1$) operator is shown in the following pseudo-code:

```
MakeEdge(v₀,v₁)
{
    a ← {{v₁,v₀,v∞},{{b,1},{b,0},{b,2}}};
    b ← {{v₀,v₁,v∞},{{a,1},{a,0},{a,2}}};
    insert a and b into mesh T;
    return {a,1};
}
```

Figure 5:
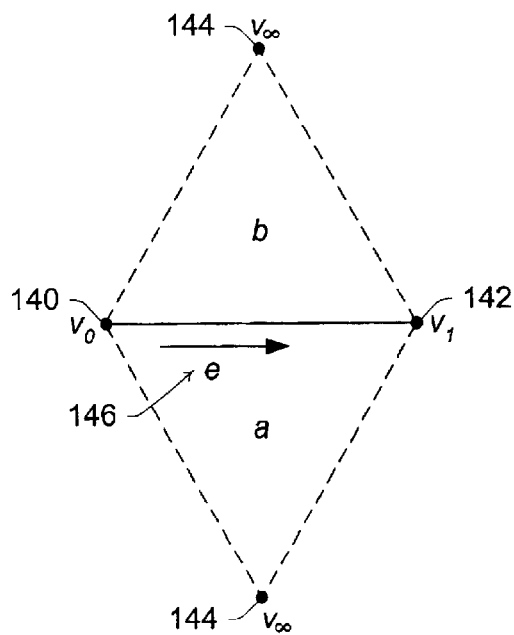
FIG. 5 illustrates an example of two triangles having been created.

The two triangles created by the MakeEdge($v_0,v_1$) operator are illustrated in FIG. 5. The MakeEdge($v_0,v_1$) operator creates two triangles a and b having adjacent edges between vertex 140 ($v_0$) and vertex 142 ($v_1$). Additionally, each of the two triangles a and b share a vertex 144 ($v_\infty$). Although vertex 144 ($v_\infty$) is a common vertex, it has been shown twice due to the limitations of illustrating the triangles on the two-dimensional nature surface of the drawing page. The vertex $v_\infty$ is the special boundary vertex, so the triangle edges are illustrated with dashed lines.

The Splice(a,b) operator receives as input a pair of edges a and b and rearranges the edge links within the associated triangles so as to re-identify the edge pairs. The Splice(a,b) operator alters the connectivity of the mesh, changing the tri-edge structures for the triangles involved. An exemplary implementation of the Splice(a,b) operator is shown in the following pseudo-code:

```
Splice(a,b)
{
    a' ← onext(a);
    b' ← onext(b);
    α ← rot(a');
    β ← rot(b');
    α' ← rot⁻¹(a);
    β' ← rot⁻¹(b);
    setOnext(a,b');
    setOnext(b,a');
    setOnext(α,β');
    setOnext(β,α');
}
```

Figure 6:
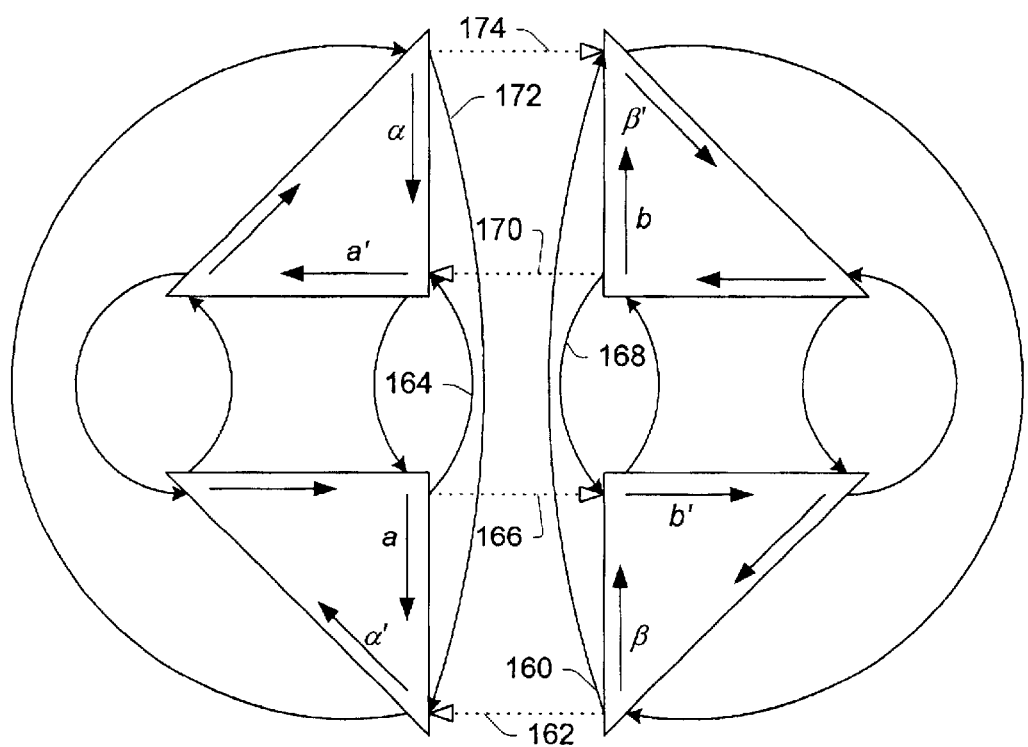
FIG. 6 illustrates an example of the operation of a splice operator.

The effect of the Splice(a,b) operator on a pair of simple meshes is illustrated in FIG. 6. Given the pair of edges a and b, the Splice(a,b) operator alters the connectivity of the mesh as illustrated in FIG. 6. The original connectivity of the mesh is illustrated by the solid curved lines, while the dashed lines indicate new links replacing old links with the same origin. Thus, link 160 is replaced by link 162, link 164 is replaced by link 166, link 168 is replaced by link 170, and link 172 is replaced by link 174.

In certain embodiments, care should be taken when using the Splice(a,b) operator to ensure that the cycle of triangles about org(a) and dest(b) (that is, the triangles encountered when traversing about the vertices org(a) and dest(b)) do not overlap, and that the cycle of triangles about dest(a) and org(b) do not overlap. This can be accomplished at a higher programming level (e.g., by application 102 of FIG. 1, which calls the Splice(a,b) operator), or alternatively additional checks could be added to the beginning of the Splice(a,b) process to verify that these cycles of triangles do not overlap (and the process not be performed if they do overlap).

The Swap(e) operator sets the input edge e to the opposite diagonal of a quadrilateral and returns this newly set edge. An exemplary implementation of the Swap(e) operator is shown in the following pseudo-code:

```
Swap(e)
{
    a ← onext(e);
    b ← rot⁻¹(e);
    setOrg(a,dest(b));
    setOrg(b,dest(a));
    Splice(a,e);
    Splice(a,sym(b));
    return a;
}
```

Figure 7:
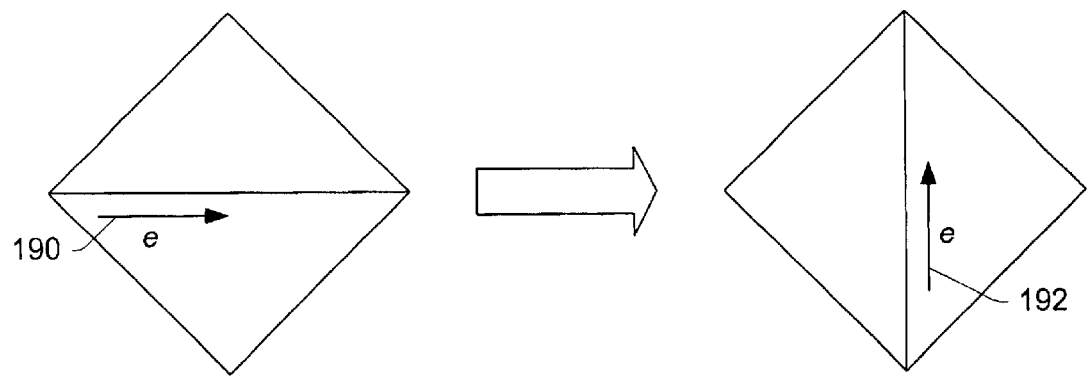
FIG. 7 illustrates an example of the operation of a swap operator.

The effect of the Swap(e) operator is illustrated in FIG. 7. The edge 190 (e) is the input to the Swap(e) operator. The edge e is then changed and set to be edge 192 by the Swap(e) operator.

Given the operators and structures defined above, triangles can be added to and removed from a mesh using an AddTriangle process and a RemoveTriangle process, respectively. These processes will be discussed in the following figures.

Figure 8:
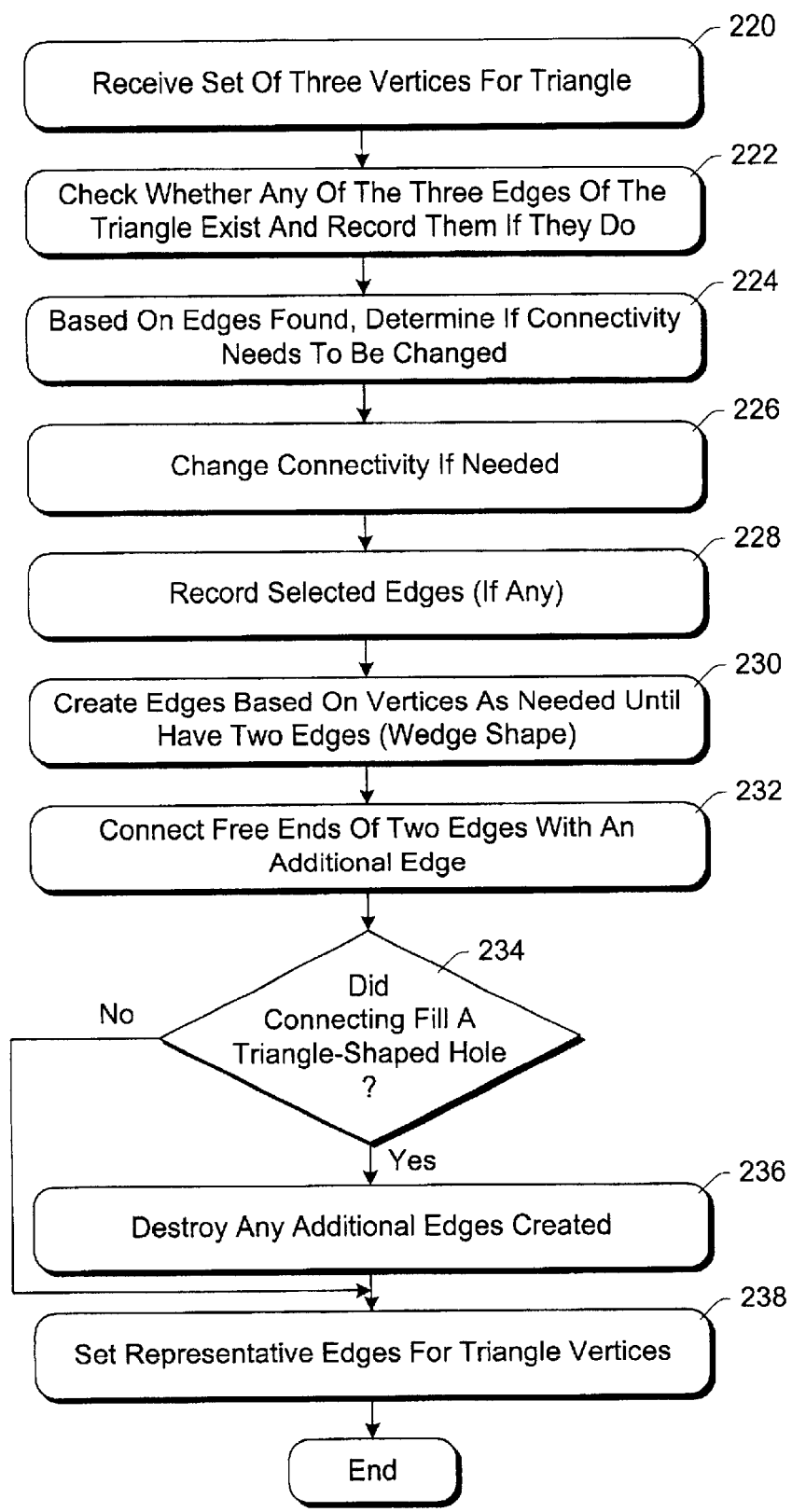
FIG. 8 illustrates an exemplary process for adding a triangle to a triangular mesh.

FIG. 8 illustrates an exemplary process for adding a triangle to a triangular mesh. The process of FIG. 8 can be implemented in hardware, software, firmware, or combinations thereof.

Initially, a set of three vertices for the triangle to be added are received (act 220). A check is then made as to whether any of the three edges for the triangle to be added already exist (act 222). One or more of the three edges may already exist, depending on the vertices for the new triangle and any previous triangles added to the mesh. Based on the edges found, a determination is then made as to whether the connectivity of any of the pre-existing edges needs to be changed (act 224). Situations can arise where the triangle to be added cannot be added unless the connectivity of some pre-existing edges are changed, as discussed in more detail below. In such situations, the necessary changes in connectivity are made (act 226).

A set of zero or more selected edges is then recorded (act 228). These are edges that will be used to create the new triangle, as discussed in more detail below. The triangle addition process obtains two edges for the new triangle, then adds the third edge to those two edges to form the triangle. If two such edges already exist, then no new edges need to be created. However, if no edges exist, then two edges need to be created, and if only one edge exists, then one new edge needs to be created (act 230). These two edges of the triangle will form a wedge or "V" shape. The free ends of the two edges (i.e., the vertex of each edge that is not shared by the other edge) are then connected with a third edge (act 232).

A check is then made as to whether connecting the two edges in act 232 resulted in filling a triangle-shaped hole (act 234). If the triangle is being added to fill in a hole in the mesh of the same size as the triangle being added, then additional acts are performed. These additional acts comprise destroying any additional edges that were created during the connecting process of act 234 (act 236). For example, use of the MakeEdge operator discussed above may result in having an additional edge (with one vertex that is the boundary vertex) that is not needed. After destroying any such additional edges, or if connecting the two edges did not result in filling a triangle-shaped hole, then a representative edge is set for each vertex of the triangle (act 238), completing the triangle addition process.

Figure 9A:
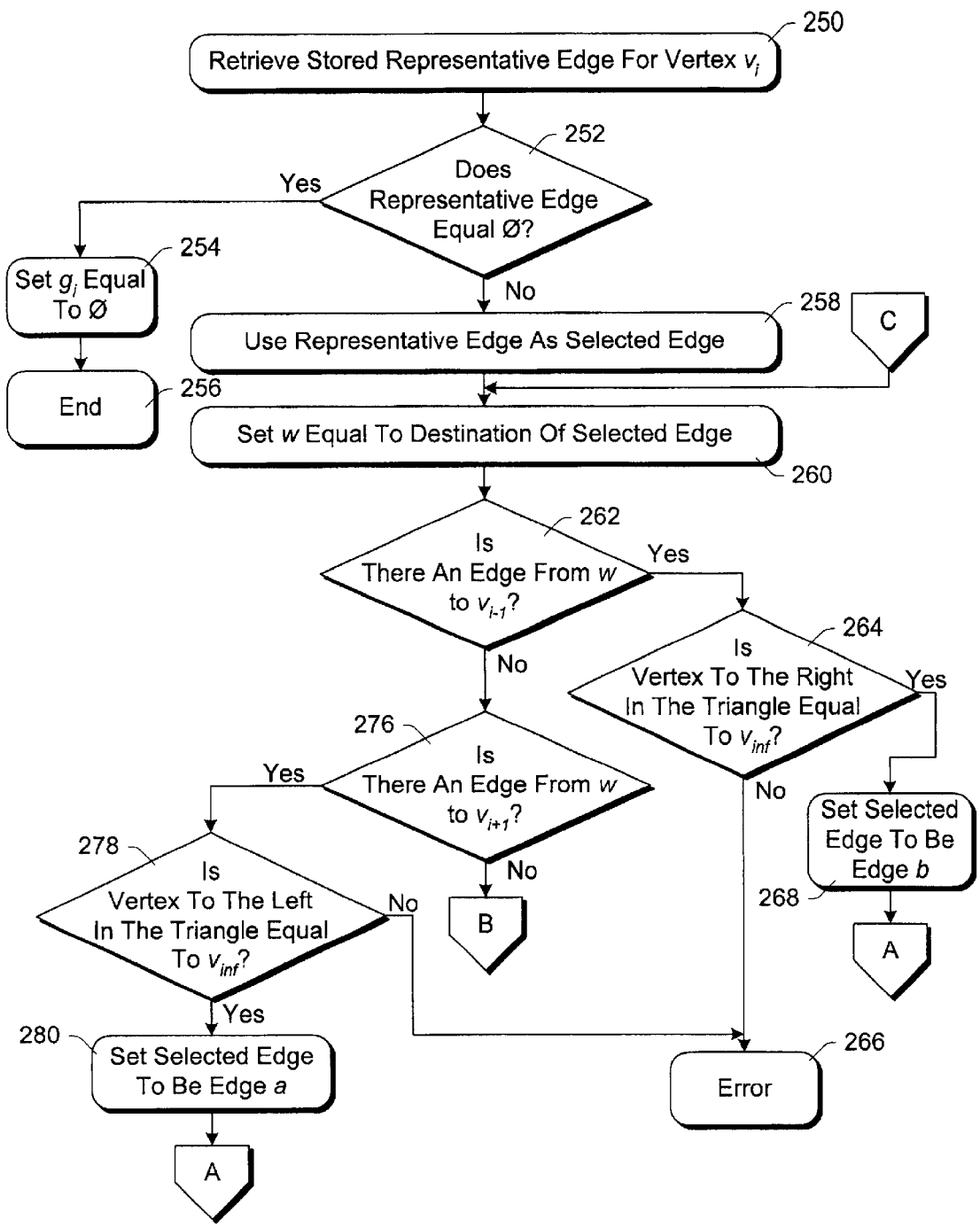
FIGS. 9a and 9b illustrate an exemplary process for checking whether edges of a triangle exist.
Figure 9B:
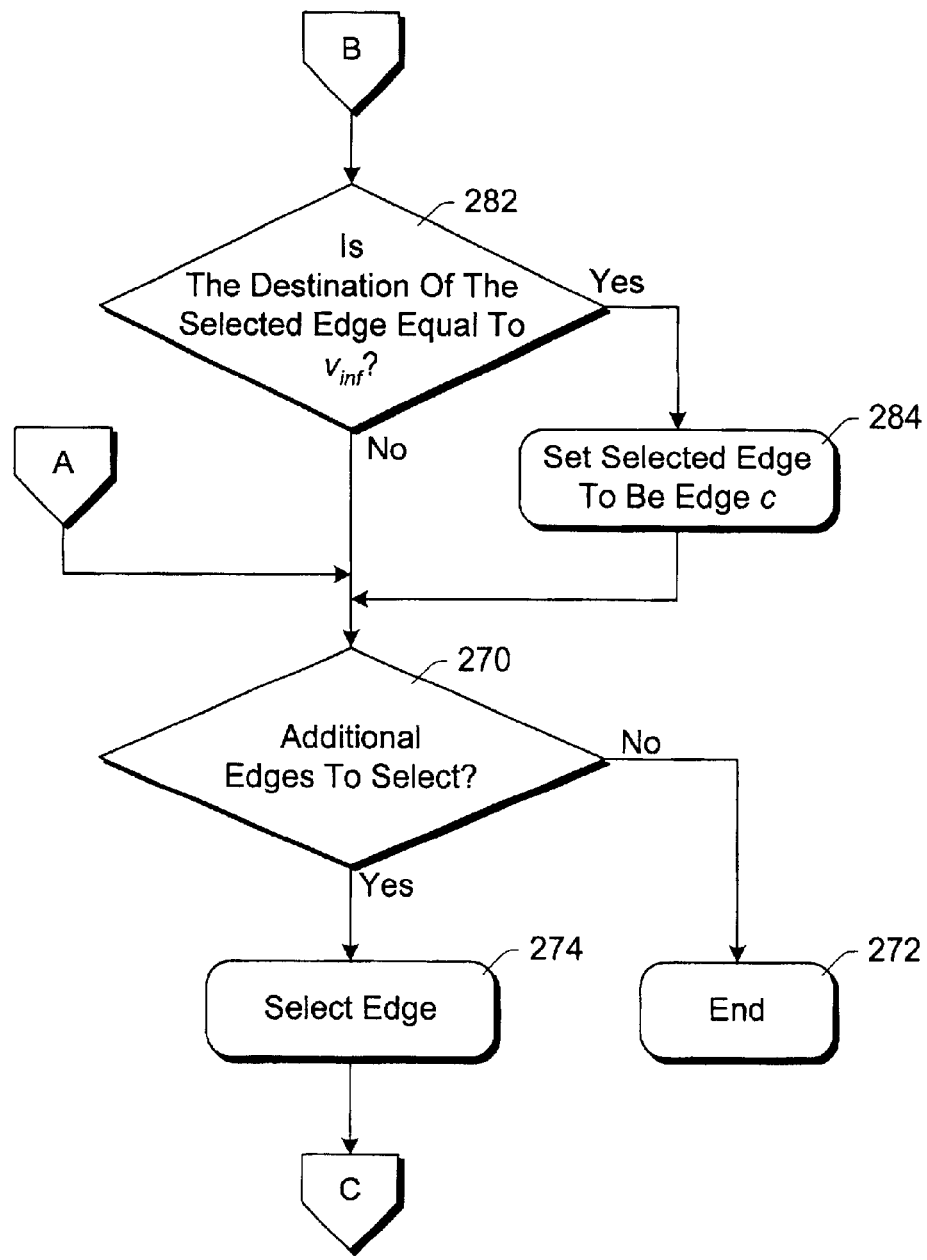
Figure 10:
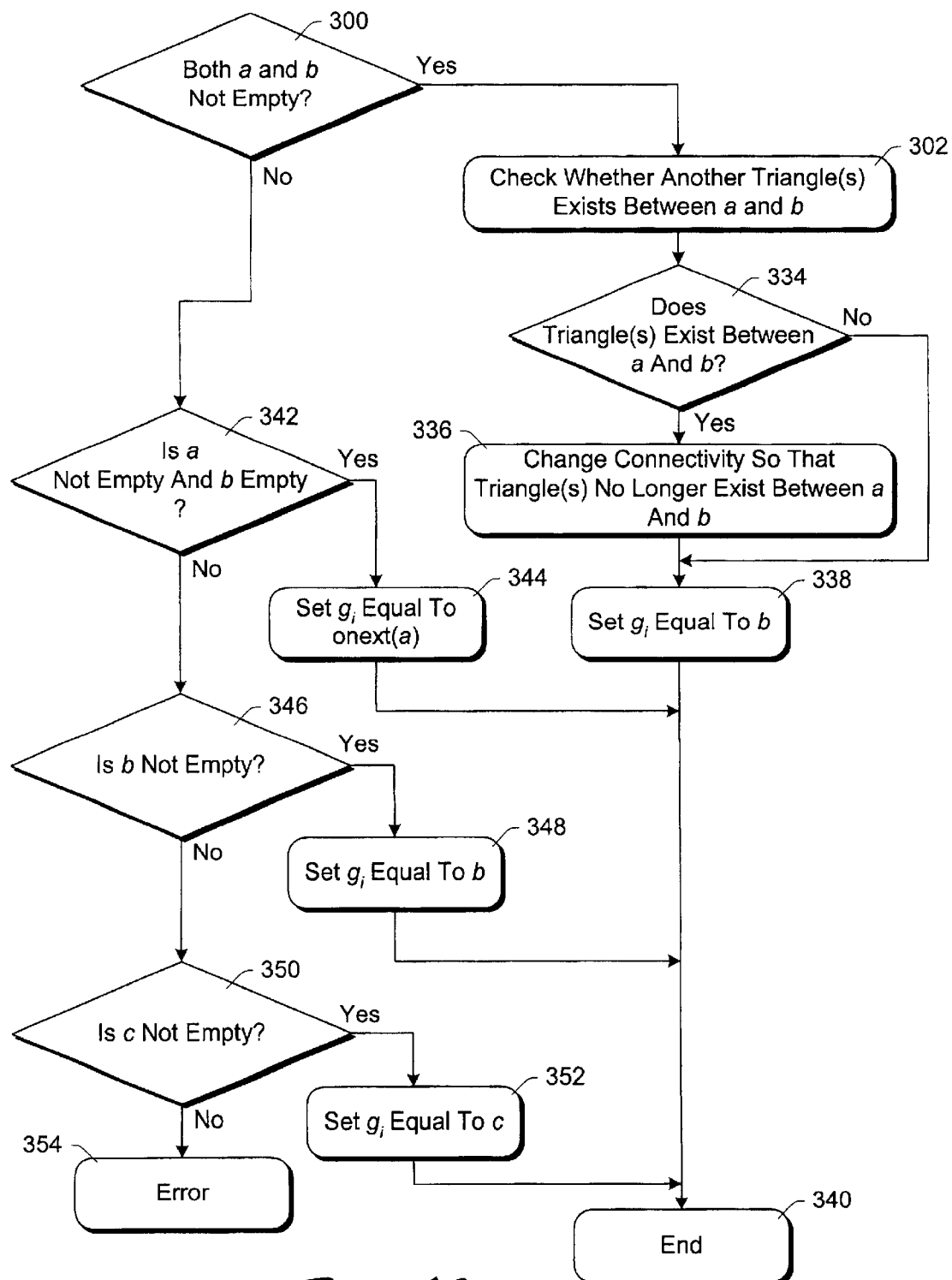
FIG. 10 illustrates an exemplary process for determining and changing connectivity if needed and recording selected edges.

FIGS. 9a and 9b illustrate an exemplary process for checking whether edges of a triangle exist (act 222 of FIG. 8). The process of FIGS. 9a and 9b can be implemented in hardware, software, firmware, or combinations thereof. The process of FIGS. 9a and 9b is repeated for each of the three vertices received in act 220 of FIG. 8 (i.e., the value i ranges from 0 to 2). The process of FIGS. 9a and 9b, as well as the process of FIG. 10 below, refers to edges a, b, and c. The edges a, b, and c are referred to in FIGS. 9a, 9b, and 10 are defined as follows: edge a is the edge from vertex $v_i$ to vertex $v_{i+1}$, edge b is the edge from vertex $v_i$ to vertex $v_{i-1}$, and edge c is the edge from vertex $v_i$ to vertex $v_\infty$.

Initially, the stored representative edge for the vertex $v_i$ is retrieved (act 250), and a check made as to whether the representative edge is the empty set (act 252). If the representative edge is empty (that is, the vertex is an isolated vertex that is not part of any edge in the mesh), then a value $g_i$ is set to be equal to the empty set (act 254), and the process ends for that vertex (act 256).

However, if the representative edge is not empty, then the representative edge is used as a selected edge (act 258) and a variable w is set to be equal to the destination vertex of the selected edge (act 260). A check is then made as to whether there is an edge from w to the vertex $v_{i-1}$ (act 262). If there is such an edge, then a check is made as to whether the vertex to the right in the triangle (e.g., using the right( ) operator discussed above) is equal to $v_\infty$ (act 264). If the vertex to the right in the triangle is not equal to $v_\infty$ then an error is reported (act 266) and the triangle addition process ends. However, if the vertex to the right in the triangle is equal to $v_\infty$ then the selected edge is set to be edge b for the new triangle (act 268) and a check is made as to whether there are any additional edges to select (act 270 of FIG. 9b). In the illustrated example, selection of additional edges continues until either all edges have been selected or both of the edges a and b have been identified. If there are no additional edges to select then the process ends (act 272); otherwise, another edge is selected (act 274) and processing continues at act 260 with the newly selected edge.

Returning to act 262 in FIG. 9a, if there is not an edge from w to the vertex $V_{i-1}$ then a check is made as to whether there is an edge from w to the vertex $v_{i+1}$ (act 276). If there is such an edge, then a check is made as to whether the vertex to the left in the triangle (e.g., using the left( ) operator discussed above) is equal to $v_\infty$ (act 278). If the vertex to the left in the triangle is not equal to $v_\infty$ then an error is reported (act 266) and the triangle addition process ends. However, if the vertex to the left in the triangle is equal to $v_\infty$ then the selected edge is set to be edge a for the new triangle (act 280) and a check is made as to whether there are any additional edges to select (act 270 of FIG. 9b).

Returning to act 276 of FIG. 9a, if there is not an edge from w to the vertex $v_{i+1}$ then a check is made as to whether the destination of the selected edge is equal to $v_\infty$ (act 282 of FIG. 9b). If the destination of the selected edge is equal to $v_\infty$ then the selected edge is set to be edge c for the new triangle (act 284) and a check is made as to whether there are any additional edges to select (act 270). Returning to act 282, if the destination of the selected edge is no equal to $v_\infty$ then a check is made as to whether there are any additional edges to select (act 270).

FIG. 10 illustrates an exemplary process for determining and changing connectivity if needed and recording selected edges (acts 224, 226, and 228 of FIG. 8). The process of FIG. 10 can be implemented in hardware, software, firmware, or combinations thereof. The process of FIG. 10 is repeated for each of the three vertices received in act 220 of FIG. 8.

Figure 11:
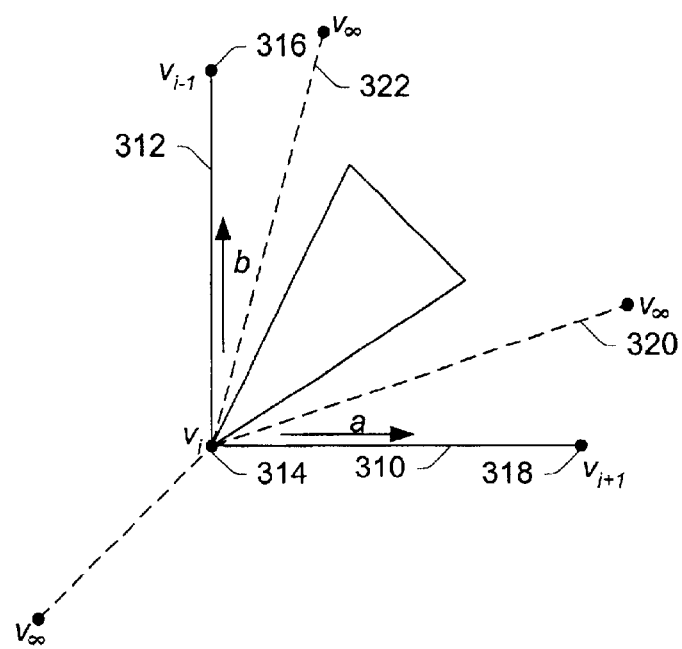
FIG. 11 illustrates an exemplary situation that can be encountered with respect to the process of FIG. 10.

Initially, a check is made as to whether a and b are both not empty (act 300). If a and b are both not empty, then a check is made as to whether another triangle(s) exists between a and b (act 302). FIG. 11 illustrates an exemplary situation where another triangle(s) exists between the two edges a and b. As illustrated, the edge 310 (a) and edge 312 (b) are two edges of the triangle to be added to a mesh based on the vertices 314 ($v_i$), 316 ($v_{i-1}$), and 318 ($v_{i+1}$). The triangles existing in a counter-clockwise traversal about vertex 314 ($v_i$) between line 320 (onext(a)) and line 322 (oprev(b)) are removed prior to completing the triangle addition process.

Returning to FIG. 10, if one or more other triangles do exist between a and b (act 334) then connectivity of the triangles is changed so that the triangle(s) no longer exist between a and b (act 336). A value of $g_i$ is then set to be the edge b (act 338) and the process ends for vertex $v_i$ (act 340). Returning to act 334, if one or more other triangles do not exist between a and b, then processing proceeds to act 338 without altering the connectivity of any of the triangles.

Returning to act 300, if both a and b are not both not empty (that is, one or both of a and b is empty), then a check is made as to whether just a is not empty and b is empty (act 342). If a is not empty and b is empty, then a value of g, is set to be the edge onext(a) (act 344) and the process ends for vertex $v_i$ (act 340). However, if a is empty or b is not empty, then a check is made as to whether b is not empty(act 346). If b is not empty, then a value of $g_i$ is set to be the edge b (act 348) and the process ends for vertex $v_i$ (act 340). However, if b is empty, then a check is made as to whether edge c is not empty (act 350). If c is not empty, then a value of $g_i$ is set to be the edge c (act 352) and the process ends for vertex $v_i$ (act 340). However, if c is empty, then an error is reported (act 354) and the triangle addition process ends.

The following pseudocode is an exemplary implementation for the process of adding a triangle to a mesh. The pseudocode relies on three predicates, which are defined as follows:

TABLE 1

| Stator IRad | Gap (in) | T-friction (in lbs) |
|---|---|---|
| 0.357 | −0.034 | 2.70E-03 |
| 0.391 | −0.068 | 1.62E-03 |
| 0.422 | −0.099 | 1.08E-03 |

Figure 12A:
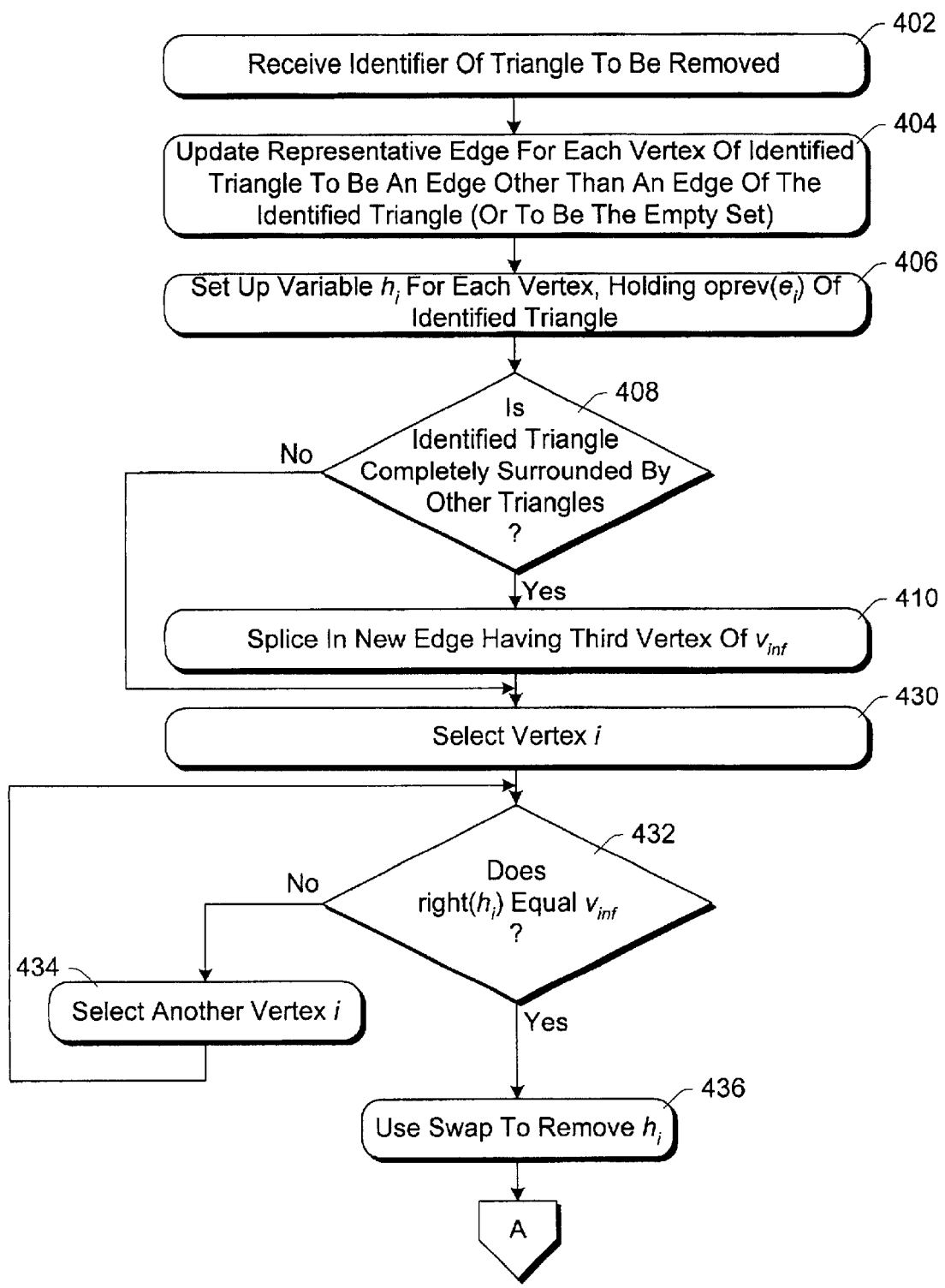
FIGS. 12a and 12b illustrate an exemplary process for removing a triangle from a triangular mesh.
Figure 12B:
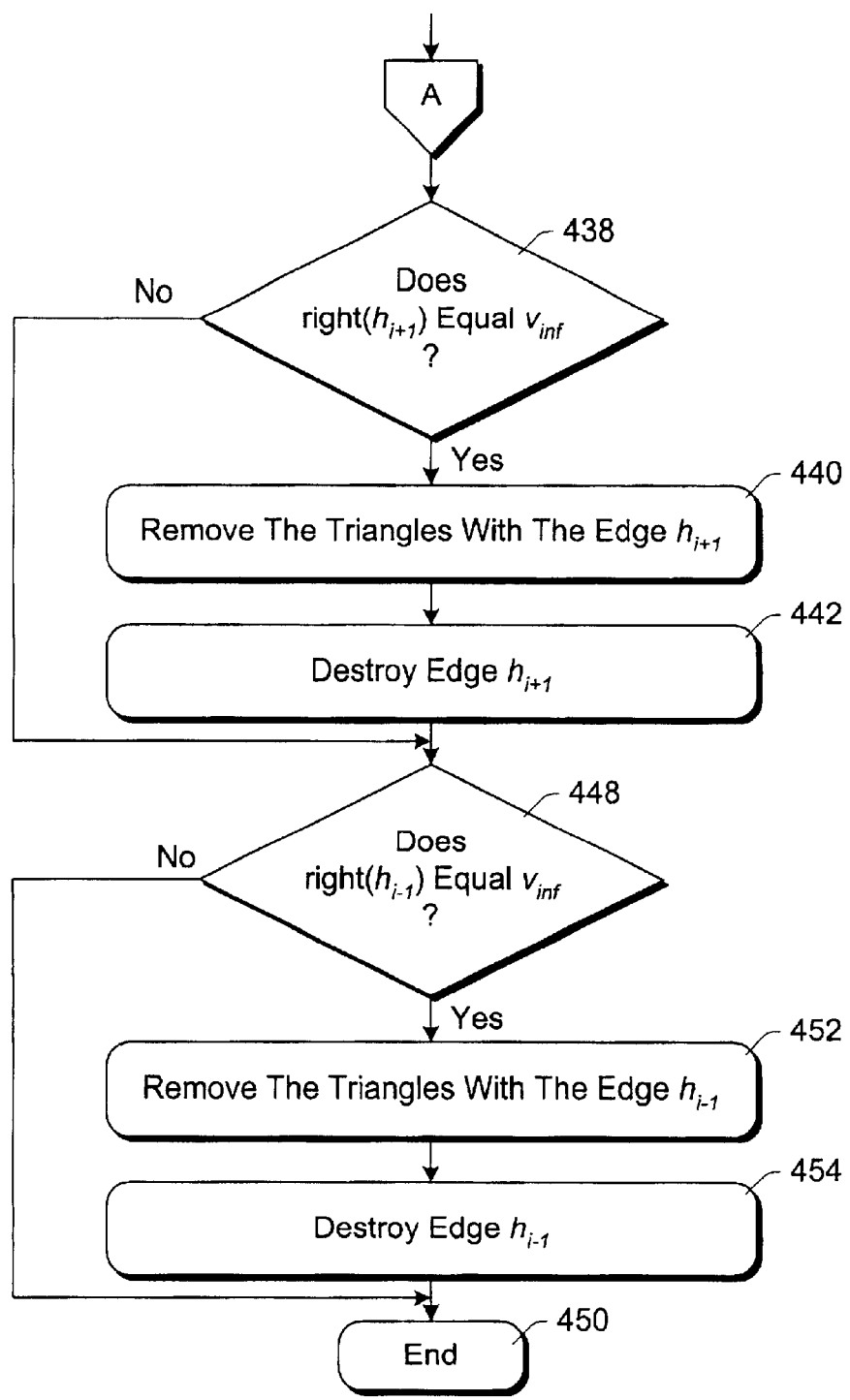

FIGS. 12a and 12b illustrate an exemplary process for removing a triangle from a triangular mesh. The process of FIGS. 12a and 12b can be implemented in hardware, software, firmware, or combinations thereof.

Initially, an identifier of the triangle to be removed is received (act 402). For each vertex in the identified triangle, the representative edge for the vertex is updated to be either an edge that is not part of the identified triangle or the empty set (act 404), so that once removed no vertex will have a representative edge that is an edge of the removed triangle (and thus no longer part of the mesh). Also, for each vertex $v_i$ in the identified triangle a temporary variable ($h_i$ in the illustrated example) is set up holding the value of oprev($e_i$) for the edge (act 406).

Figure 13:
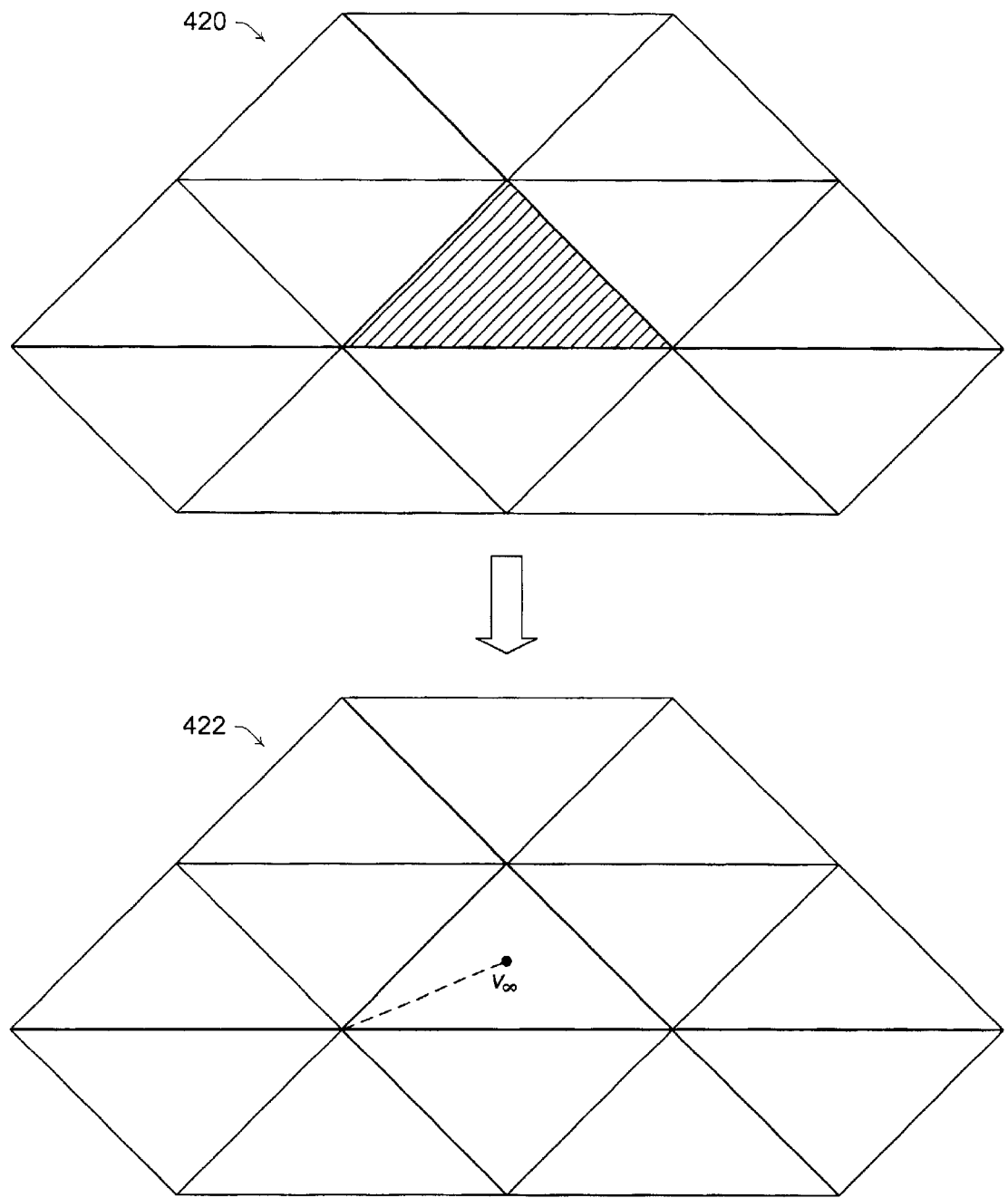
FIG. 13 illustrates an example of splicing in a new edge during the process of FIGS. 12a and 12b.

A check is then made as to whether the identified triangle is completely surrounded by other triangles (act 408). If so, then a new edge is spliced into the mesh having a third vertex of $v_\infty$ (act 410), allowing new triangles to be created (having a vertex at $v_\infty$) as part of the removal process. FIG. 13 illustrates the process in act 410 in more detail. Assume that a triangle is going to be removed from the interior of mesh 420 (a cross-hatch pattern is used in FIG. 13 to identify the triangle to be removed). This will leave a hole in mesh 420 where the triangle was, and so an additional edge is added as illustrated in mesh 422 having a third vertex at $v_\infty$. This creates the basis for three additional triangles in the hole being left by the triangle being removed, and each of the three additional triangles is a boundary triangle.

Returning to FIG. 12a, after splicing in the new edge in act 410, or if the identified triangle is not completely surrounded by other triangles, then one vertex of the identified triangle is selected (act 430). A check is then made as to whether right($h_i$) given the selected vertex equals $v_\infty$ (act 432). If right($h_i$) given the selected vertex does not equal $v_\infty$ then another vertex is selected (act 434), and the check is repeated. Once a vertex is selected such that right(hi) equals vat then the Swap operator (discussed above) is used to remove the edge $h_i$ from the mesh (act 436). This situation is illustrated in more detail in FIG. 14. The value of right($h_i$) where $h_i$ is edge 430 is the vertex 432. By using the Swap operator, the edge 430 is removed and replaced with the edge 434 (having a vertex at $v_\infty$).

Figure 14:
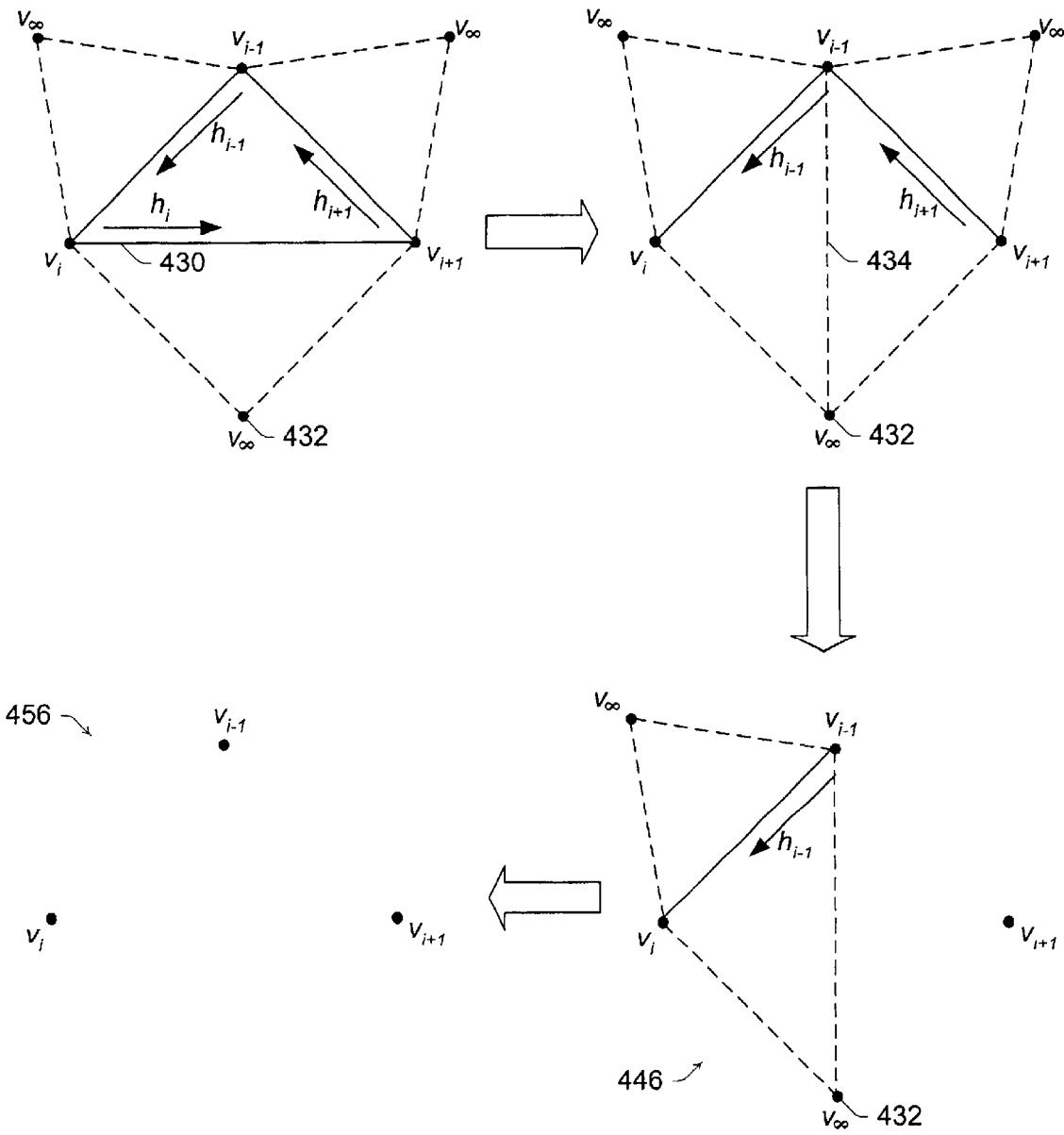
FIG. 14 illustrates example results of removing edges of a triangle from a mesh.

Returning to FIG. 12b, after removing $h_i$ a check is made as to whether right($h_{i+1}$) equals $v_\infty$ (act 438). If right($h_{i+1}$) equals $v_\infty$ then triangles with the edge $h_{i+1}$ are removed (act 440) and the edge $h_{i+1}$ is destroyed (act 442). Referring to FIG. 14, the resultant mesh after removing the two triangles that had edge $h_{i+1}$ as an edge and destroying edge $h_{i+1}$ is mesh 446.

Returning again to FIG. 12b, after destroying edge $h_{i+1}$ in act 442 (or if right($h_{i+1}$) does not equal $v_\infty$), then a check is made as to whether right($h_{i-1}$) equals $v_\infty$ (act 448). If right($h_{i-1}$) does not equal $v_\infty$ then the removal process ends (act 450). However, if right($h_{i-1}$) equals $v_\infty$ then triangles with the edge $h_{i-1}$ are removed (act 452), the edge $h_{i-1}$ is destroyed (act 454), and the removal process ends (act 450). Referring to FIG. 14, the resultant mesh after removing the two triangles that had edge $h_{i-1}$ as an edge and destroying edge $h_{i-1}$ is mesh 456 (just the three vertices $v_i$, $v_{i-1}$, and $v_{i+1}$.

The following pseudocode is an exemplary implementation for the process of removing a triangle from a mesh.

```
RemoveTriangle(t)
{
    for (i = 0, . . .,2) {
        e ← {t,i};
        h₁ ← oprev(e);
        vᵢ ← org(e);
        if (right(hᵢ) = v∞)
            if(oprev(hᵢ) = onext(e)))
                setRep(vᵢ,Ø);
            else
                setRep(vᵢ,oprev(oprev(hᵢ)));
        else
            setRep(vᵢ,hᵢ);
    }
    if ((right(h₀) ≠ v∞) and
        (right(h₁) ≠ v∞) and
        (right(h₂) ≠ v∞)) {
        e ← MakeEdge(v₀,v₁);
        Splice(h₀,e);
        h₀ ← e;
    }
    i ← Ø;
    repeat {
        if (right(hᵢ) = v∞) {
            Swap(hᵢ);
            if (right(hᵢ₊₁) = v∞) {
                e ← sym(hᵢ₊₁);
```

-continued

```
            Splice(oprev(h_{i+1}),rot^{-1}(e));
            Splice(oprev(e),onext(e));
            DestroyEdge(h_{i+1});
        }
        if (right(h_{i-1}) = v_∞) {
            e ← sym(h_{i-1});
            Splice(oprev(h_{i-1}),rot^{-1}(e));
            Splice(oprev(e),onext(e));
            DestroyEdge(h_{i-1});
        }
        return;
    }
    i ← i+1;
  }
}
```

The manifold spaces represented using the structures, operators, and processes described herein exhibit the following characteristics:

a. The triangle mesh resulting from a series of calls to MakeEdge( ) and valid calls to Splice( ) is homeomorphic to a collection of closed, oriented surfaces.

b. The triangle mesh resulting from a series of calls to AddTriangle( ) and RemoveTriangle( ) is homeomorphic to a collection of closed, oriented surfaces such that all vertices are shared by at least three triangles (although an exception to this is that AddTriangle( ) will allow the creation of a simple mesh component with all three edges shared by a pair of interior triangles).

c. The triangle mesh resulting from a series of calls to AddTriangle( ) and RemoveTriangle( ) with boundary triangles removed is homeomorphic to a collection of oriented surfaces, possibly with boundary.

The structures described herein can be implemented in any of a wide variety of manners. The following are exemplary implementations of the structures using the C++ programming language, although other structures could alternatively be used. The following is the structure definition for a mesh structure:

```
struct Mesh
{
    Vertex[ ]    vertices;
    Edge[ ]      representatives;
    Triangle[ ]  triangles;
    Triedge[ ]   triedges;
    uint32       numVertices;
    uint32       numTriangles;
    uint32       numInterior;
    uint32       numBoundary;
};
```

In the Mesh structure definition, "uint32" refers to an unsigned 32-bit integer, "Edge[ ]" is a set of edge structures (defined below) for the mesh, "Triangle[ ]" is a set of triangle structures (defined below) for the mesh, and "Triedge[ ]" is a set of tri-edge structures (defined below) for the mesh. "Vertex[ ]" is a set of vertex structures for the mesh, each identifying a vertex in the mesh (the definition of the vertex structure is system dependent, and thus is not discussed further herein). Additionally, "numVertices" refers to the total number of vertices in the mesh, "numInterior" refers to the number of interior triangles in the mesh, "numBoundary" refers to the number of boundary triangles in the mesh, and "numTriangles" refers to the total number of triangles in the mesh (should be equal to the sum of numInterior and numBoundary).

The "Edge[ ]", "Triangle[ ]", and "Triedge[ ]" structures are defined as follows:

| | |
|---|---|
| Process A. | 1. Deposit a layer of Al on the floating gate to provide a planar, conducting surface.<br>2. Deposit a layer of Ti—Zr alloy.<br>3. Deposit a $TiO_2$—$ZrO_2$ film using a modified process such as that described in the above article by Smith et al. Vary the ratio of $Ti(NO_3)_4/Zr(NO_3)_4$ reactants with time to produce: an initial oxide composition having a Ti/Zr concentration ratio close to that of the underlying alloy; and, a gradient that increases in Zr concentration with thickness. A relative concentration-distance profile is shown schematically after oxide formation in FIG. 9A. The outer barrier will be greater than the inner.<br>4. Vacuum anneal under conditions needed to remove unstable, excess oxygen. Treatments must be found, not being known a priori.<br>5. Complete the structure by adding the top electrode material such as: a Ti/Zr alloy, Al or a noble metal such as Pt or Pd, etc. |
| Process B. | 1. Deposit a layer Al on the Si floating gate. This serves as an adhesion layer for the noble metal and prevents silicide formation.<br>2. Deposit Pt or Pd, e.g., to act as an oxidation barrier.<br>3. Deposit a graded oxide.<br>4. Remove the excess oxygen.<br>5. Add the top electrode layer. (See generally, FIG. 9B). |
| Process C. | 1. Modify the graded mixed oxides produced above in order to stabilized their as-deposited structure and prevent unwanted crystallization and grain grown. This can be done with small additions of glass-forming elements to the anhydrous metal nitrate reactants. For silicon, this might involve using a volatile halide compound since Si does not form nitrates or nitrides. |

Thus, as can be seen by the definitions, each edge includes a triangle identifier t and a position index i, each triangle contains three vertex structures, and each tri-edge contains three edge structures.

Figure 15:
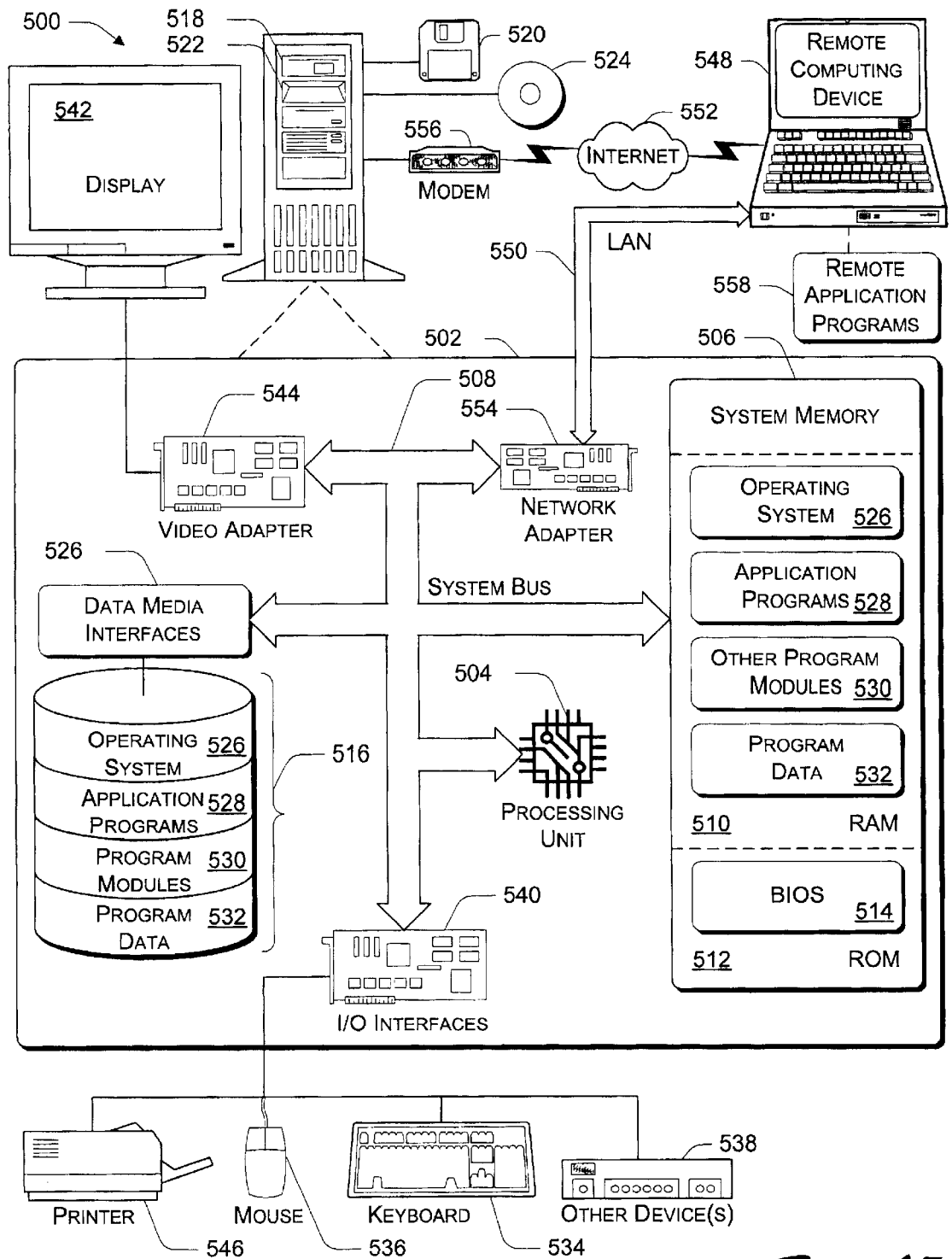
FIG. 15 illustrates an exemplary computer environment, which can be used to implement the processes described herein.

FIG. 15 illustrates an exemplary computer environment 500, which can be used to implement the processes described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be used to implement, for example, environment 100 of FIG. 1. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 15 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor or other type of display device 542 can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Computer 502 typically includes at least some form of computer readable media. Computer readable media can be any available media that can be accessed by computer 502. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 502. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

The discussions herein describe various operators and exemplary implementations that are specific to certain directions. In alternate embodiments, these directions can be different. For example, the Onext( ) operator is discussed with reference to counterclockwise traversal about a vertex. Alternatively, the Onext( ) operator may refer to clockwise traversal about a vertex.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A system comprising:
   a memory to store a plurality of triangle definition structures corresponding to a plurality of triangles, wherein each of the plurality of triangle definition structures includes a set of three vertices for the triangle, and wherein each of the plurality of triangle definition structures further includes a set of three edges, wherein each of the three edges corresponds to one of the three vertices, and wherein each of the three edges is an identification of the next edge that is encountered when performing a traversal in a particular direction about the corresponding vertex; and
   a plurality of modules, coupled to be able to operate on the plurality of triangle definition structures, where each of the plurality of modules includes one or more instructions, and wherein each of the plurality of modules, when executed, manipulates various aspects of one or more of the plurality of triangle definition structures;
   wherein one of the plurality of modules comprises a remove triangle process, wherein the remove triangle process removes a triangle definition structure from the plurality of triangle definition structures.

2. A system as recited in claim 1, wherein the particular direction comprises a counter-clockwise direction.

3. A system as recited in claim 1, wherein another of the plurality of modules comprises an add triangle module that adds a new triangle definition structure to the plurality of triangle definition structures.

4. A system as recited in claim 3, wherein the add triangle module receives, as an input, a set of three vertices from which to create the new triangle definition structure.

5. A system as recited in claim 1, wherein the remove triangle process further modifies one or more other definition structures of the plurality of triangle definition structures to account for the triangle definition structure being removed.

6. A system as recited in claim 1, wherein another of the plurality of modules comprises a rotate operator that receives an edge of a triangle as an input, and returns a next edge in the triangle in the counterclockwise direction.

7. A system as recited in claim 1, wherein another of the plurality of modules comprises an inverse rotate operator that receives an edge of a triangle as an input, and returns the next edge in the triangle in the clockwise direction.

8. A system as recited in claim 1, wherein another of the plurality of modules comprises a next edge operator that receives an edge of a triangle as an input, and returns the next edge from the triangle when rotating in a counterclockwise direction about a vertex of the triangle that is the origin of the input edge.

9. A system as recited in claim 1, wherein another of the plurality of modules comprises a previous edge operator that receives an edge of a triangle as an input, and returns the next edge from the triangle when rotating in a clockwise direction about a vertex of the triangle that is the origin of the input edge.

10. A system as recited in claim 1, wherein another of the plurality of modules comprises a same operator that receives an edge of a triangle as an input, and returns an edge of another triangle that has the same vertices as the input edge.

11. A system as recited in claim 1, wherein another of the plurality of modules comprises a origin operator that receives an edge of a triangle as an input, and returns a vertex that is an origin of the edge.

12. A system as recited in claim 1, wherein another of the plurality of modules comprises a right operator that receives an edge of a triangle as an input, wherein the input edge has an origin vertex, and wherein the right operator returns another vertex of an edge that shares the origin vertex with the input edge.

13. A system as recited in claim 1, wherein another of the plurality of modules comprises a left operator that receives an edge of a triangle as an input, and returns a vertex that is a destination of the next edge from the triangle when rotating in a counterclockwise direction about a vertex of the triangle that is the origin of the input edge.

14. A system as recited in claim 1, wherein another of the plurality of modules comprises a set representative edge operator that receives both an edge of a triangle and a vertex of the triangle as inputs, and sets the input edge to be the representative edge of the input vertex.

15. A system as recited in claim 1, wherein another of the plurality of modules comprises a set origin operator that receives both an edge of a triangle and a vertex of the triangle as inputs, and sets a vertex of the triangle corresponding to an origin of the edge to be the input vertex.

16. A system as recited in claim 1, wherein another of the plurality of modules comprises a set next edge operator that receives both an a first edge and a second edge as inputs, and sets one of the edges in the triangle definition structure for the triangle definition structure for the triangle that the first edge is part of to be the second edge.

17. A system as recited in claim 1, wherein another of the plurality of modules comprises a make edge operator that receives both a first vertex and a second vertex as inputs, and generates two triangle definition structures to be added to the plurality of triangle definition structures, wherein each of the two triangle definition structures identifies, as the set of three vertices of the corresponding triangles, the input first vertex, the input second vertex, and a third vertex that is a boundary vertex.

18. A system as recited in claim 17, wherein each of the two triangle definition structures further identifies, as the set of three edges for the corresponding triangles, edges of the other triangle.

19. A system as recited in claim 1, wherein another of the plurality of modules comprises a splice operator that receives both a first edge and a second edge as inputs, alters the set of edges of the triangle definition structure of the triangle including the first edge, and alters the set of edges of the triangle definition structure of the triangle including the second edge.

20. A system as recited in claim 1, wherein another of the plurality of modules comprises a splice operator that receives both a first edge and a second edge as inputs, and wherein the splice operator:

identifies a third edge as a next edge, from a first triangle including the first edge, when rotating in a counterclockwise direction about a vertex of the first triangle that is the origin of the first edge;

identifies a fourth edge as a next edge, from a second triangle including the second edge, when rotating in a counterclockwise direction about a vertex of the second triangle that is the origin of the second edge;

identifies a fifth edge as a next edge in the first triangle in the counterclockwise direction;

identifies a sixth edge as a next edge in the second triangle in the counterclockwise direction;

identifies a seventh edge as a next edge in the first triangle in the clockwise direction;

identifies an eighth edge as a next edge in the second triangle in the clockwise direction;

sets, as a next edge that would be encountered when rotating in a counterclockwise direction from the first edge about the origin of the first edge, the fourth edge;

sets, as a next edge that would be encountered when rotating in a counterclockwise direction from the second edge about the origin of the second edge, the third edge;

sets, as a next edge that would be encountered when rotating in a counterclockwise direction from the fifth edge about the origin of the fifth edge, the eighth edge; and sets, as a next edge that would be encountered when rotating in a counterclockwise direction from the sixth edge about the origin of the sixth edge, the seventh edge.

21. A system as recited in claim 20, wherein one of the plurality of modules comprises a swap operator that receives a particular edge of a triangle as an input, and wherein the swap operator:

identifies a ninth edge as a next edge, from the input particular edge, when rotating in a counterclockwise direction about the origin of the input particular edge;

identifies a tenth edge as a next edge in the input triangle in the counterclockwise direction from the input particular edge;

identifies a destination vertex of the ninth edge;

identifies a destination vertex of the tenth edge;

sets an origin of the ninth edge to be the destination vertex of the tenth edge;

sets an origin of the tenth edge to be the destination vertex of the ninth edge;

invokes the splice operator and uses, as inputs to the splice operator, the ninth edge and the input particular edge;

identifies an eleventh edge having the same vertices as the tenth edge; and again invokes the splice operator and uses, as inputs to the splice operator, the ninth edge and the eleventh edge.

22. A system as recited in claim 1, wherein another of the plurality of modules comprises a swap operator that receives an edge of a triangle as an input, and returns an opposite diagonal of a quadrilateral corresponding to the input edge.

23. A system comprising:

a memory to store a plurality of triangle definition structures corresponding to a plurality of triangles, wherein each of the plurality of triangle definition structure includes a set of three vertices for the triangle, and wherein each of the plurality of triangle definition structures further includes a set of three edges, wherein each of the three edges corresponds to one of the three vertices, and wherein each of the three edges is an identification of the next edge that is encountered when performing a traversal in a particular direction about the corresponding vertex; and a plurality of modules, coupled to be able to operate on the plurality of triangle definition structure, where each of the plurality of modules includes one or more instructions, and wherein each of the plurality of modules, when executed, manipulates various aspects of one or more of the plurality of triangle definition structures;

where one of the plurality of modules comprises a destination operator that receives an edge of a triangle as an input,and returns a vertex that is a destination of the edge.

24. A system comprising:

a memory to store a plurality of triangle definition structures corresponding to a plurality of triangles, wherein each of the plurality of triangle definition structures includes a set of three vertices for the triangle, and wherein each of the plurality of triangle definition structures, further includes a set of three edges, wherein each of the three edges corresponds to one of the three vertices, and wherein each of the three edges is an identification of the next edge that is encountered when performing a traversal in a particular direction about the corresponding vertex; and a plurality of modules, coupled to be able to operate on the plurality of triangle definition structures, where each of the plurality of modules includes one or more instructions, and wherein each of the plurality of modules, when executed, manipulates various aspects of one or more of the plurality triangle definition structures:

wherein one of the plurality of modulates comprises a get representative edge operator that receives a vertex of a triangle as an input, and returns a representative edge of the vertex.

25. A system comprising:

a memory to store a plurality of triangle definition structures corresponding to a plurality of triangles, wherein each of the plurality of triangle definition structures includes a set of three vertices for the triangle, and wherein each of the plurality of triangle definition structures further includes a set of three edges, wherein each of the three edges corresponds to one of the three vertices, and wherein each of the three edges is an identification of the next edge that is encountered when performing a traversal in a particular direction about the corresponding vertex; and a plurality of modules, coupled to be able to operate on the plurality of triangle definition structure, where each of the plurality of modules includes one or more instructions, and wherein each of the plurality of modules when executed, manipulates various aspects of one or more of the plurality of triangle definition structures;

wherein one of the plurality of modules comprises a make edge operator that receives both a first vertex and a second vertex as inputs, and generates two triangle definition structures, wherein the two triangle definition structures have adjacent edges between the first vertex and the second vertex.

26. A method for adding a triangle to a triangular mesh, the triangle having three vertices and three edges, the method comprising:

receiving an indication of the three vertices of the triangle;

checking whether any of the three edges of the triangle already exist in the triangular mesh;

if any of the three edges of the triangle already exist in the triangular mesh, then checking connectivity of the mesh, determining if any connectivity of the triangular mesh needs to be changed, and changing connectivity of the triangular mesh as necessary to accommodate the triangle;

creating additional edges for the triangle as necessary until two edges of the triangle exist; and connecting free ends of the two edges with an additional edge to create the triangle.

27. A method as recited in claim 26, further comprising setting a representative edge for each vertex of the triangle as necessary.

28. A method as recited in claim 26, further comprising setting a representative edge for each vertex of the triangle.

29. A method as recited in claim 26, wherein changing connectivity of the triangular mesh as necessary to accommodate the triangle comprises altering an edge identifier corresponding to another triangle of the triangular mesh to identify an edge of the triangle as a next edge that is encountered when performing a traversal in a particular direction about a vertex of the other triangle.

30. One or more computer-readable memories containing a computer program that is executable by a processor to perform the method recited in claim 26.

31. A method for removing a triangle from a triangular mesh, wherein each triangle in the triangular mesh includes an identification of three edges, and wherein each of the three edges is an identification of the next edge that is encountered when performing a traversal about a vertex corresponding to the edge, the method comprising:

receiving an identifier of the triangle to be removed;

updating a representative edge of each vertex of the triangle so that the representative edge is not an edge of the triangle; and for each edge of the triangle, removing the edge and changing the connectivity of other triangles in the triangular mesh so that any other triangle having an identification of a next edge that is an edge of the triangle being removed has the identification changed to another edge of the triangular mesh.

32. A method as recited in claim 31, wherein the updating comprises, for each vertex:

identifying an edge of the triangle, wherein the edge has an origin at the vertex;

identifying, based on the edge, a previous edge that is the next edge from the edge when rotating in a clockwise direction about the vertex;

identifying a right vertex based on the previous edge, wherein the right vertex is another vertex of another edge that also has the origin as one of its vertices;

checking whether the right vertex is a boundary vertex; and if the right vertex is not a boundary vertex, then setting the representative edge for the vertex to be the previous edge.

33. A method as recited in claim 32, wherein for each vertex if the right vertex is a boundary vertex, then the updating further comprises:

identifying, based on the previous edge, another previous edge that is the next edge from the previous edge when rotating in a clockwise direction about the vertex;

identifying, based on the edge, a subsequent edge that is the next edge from the edge when rotating in a counter-clockwise direction about the vertex;

checking whether the other previous edge and the subsequent edge are the same edges;

if the other previous edge and the subsequent edge are the same edges, then setting the representative edge for the vertex to be empty; and if the other previous edge and the subsequent edge are not the same edges, then identifying, based on the other previous edge, a third previous edge that is the next edge from the other previous edge when rotating in a clockwise direction about the vertex, and setting the representative edge for the vertex to be the third previous edge.

34. A method as recited in claim 31, further comprising selectively invoking a make edge operator, wherein the make edge operator receives both a first vertex and a second vertex as inputs, and generates two triangles, wherein each of the two triangles identifies, as a set of three vertices of the corresponding triangles, the input first vertex, the input second vertex, and a third vertex that is a boundary vertex, and wherein each of the two triangles further identifies, as a set of three edges for the corresponding triangles, edges of the other triangle.

35. One or more computer-readable media having stored thereon a plurality of instructions to manage a triangular mesh, wherein the plurality of instructions, when executed by one or more processors of a computer, causes the one or more processors to perform the following acts:

implementing a make edge operator that receives both a first vertex and a second vertex as inputs, and generates two triangles, wherein the two triangles have adjacent edges between the first vertex and the second vertex;

implementing a splice operator that receives both a first edge and a second edge as inputs, alters connectivity of a triangle including the first edge, and alters connectivity of a triangle including the second edge; and implementing a swap operator that receives a particular edge of a triangle as an input, and returns an opposite diagonal of a quadrilateral corresponding to the input edge.

36. One or more computer-readable media as recited in claim 35, wherein the instructions that cause the one or more processors to implement the make edge operator include instructions that cause the one or more processors to perform the following acts:

receiving both the first vertex and the second vertex as inputs; and generating the two triangles, wherein each of the two triangles identifies, as a set of three vertices of the corresponding triangle, the input first vertex, the input second vertex, and a third vertex that is a boundary vertex, and wherein each of the two triangles further identifies, as a set of three edges for the corresponding triangle, edges of the other triangle.

37. One or more computer-readable media as recited in claim 35, wherein the instructions that cause the one or more processors to implement the splice operator include instructions that cause the one or more processors to perform the following acts:

receiving both the first edge and the second edge as inputs;

identifying a third edge as a next edge encountered, from the first edge, when rotating in a counterclockwise direction about a vertex that is the origin of the first edge;

identifying a fourth edge as a next edge encountered, from the second edge, when rotating in a counterclockwise direction about a vertex that is the origin of the second edge;

identifying a fifth edge as a next edge, in the triangle including the first edge, in the counterclockwise direction;

identifying a sixth edge as a next edge, in the triangle including the second edge, in the counterclockwise direction;

identifying a seventh edge as a next edge, in the triangle including the first edge, in the clockwise direction;

identifying an eighth edge as a next edge, in the triangle including the second edge, in the clockwise direction;

setting, as a next edge that would be encountered when rotating in a counterclockwise direction from the first edge about the origin of the first edge, the fourth edge;

setting, as a next edge that would be encountered when rotating in a counterclockwise direction from the second edge about the origin of the second edge, the third edge;

setting, as a next edge that would be encountered when rotating in a counterclockwise direction from the fifth edge about the origin of the fifth edge, the eighth edge; and setting, as a next edge that would be encountered when rotating in a counterclockwise direction from the sixth edge about the origin of the sixth edge, the seventh edge.

38. One or more computer-readable media as recited in claim 37, wherein the instructions that cause the one or more processors to implement the swap operator include instructions that cause the one or more processors to perform the following acts:

receiving the particular edge of the triangle as an input;

identifying a ninth edge as a next edge, from the input particular edge, when rotating in a counterclockwise direction about the origin of the input particular edge;

identifying a tenth edge as a next edge in the input triangle in the counterclockwise direction from the input particular edge;

identifying a destination vertex of the ninth edge;

identifying a destination vertex of the tenth edge;

setting an origin of the ninth edge to be the destination vertex of the tenth edge;

setting an origin of the tenth edge to be the destination vertex of the ninth edge;

invoking the splice operator and using, as inputs to the splice operator, the ninth edge and the input particular edge;

identifying an eleventh edge having the same vertices as the tenth edge; and again invoking the splice operator and using, as inputs to the splice operator, the ninth edge and the eleventh edge.

39. One or more computer-readable media as recited in claim 35, wherein the plurality of instructions further cause the one or more processors to perform the following acts:

selectively invoking the make edge operator, the splice operator, and the swap operator to add triangles to the triangular mesh; and selectively invoking the make edge operator, the splice operator, and the swap operator to remove triangles from the triangular mesh.

* * * * *